United States Patent
Sugiura et al.

(10) Patent No.: US 6,920,948 B2
(45) Date of Patent: Jul. 26, 2005

(54) DC POWER SUPPLY USING FUEL CELL

(75) Inventors: Hiroshi Sugiura, Kariya (JP);
Tetsuhiro Ishikawa, Aichi-ken (JP);
Nobuo Watanabe, Toyota (JP); Kouta Manabe, Gold River, CA (US)

(73) Assignee: Toyoda Jidosha Kabushiki Kaisha, Toyota (JP)

( * ) Notice: Subject to any disclaimer, the term of this patent is extended or adjusted under 35 U.S.C. 154(b) by 261 days.

(21) Appl. No.: 09/968,987

(22) Filed: Oct. 3, 2001

(65) Prior Publication Data
US 2002/0038732 A1 Apr. 4, 2002

(30) Foreign Application Priority Data
Oct. 4, 2000 (JP) ........................................ 2000-304595

(51) Int. Cl.[7] .............................................. B60K 6/00
(52) U.S. Cl. ..................... 180/65.2; 180/65.8; 290/40 C
(58) Field of Search ............................... 180/65.1, 65.2, 180/65.3, 65.4, 65.5, 65.6, 65.7, 65.8, 303, 68.3, 69.5; 290/40 C, 40 A, 40 F; 320/137, 140; 701/22; 429/34, 38, 7, 23, 22; 307/43, 86

(56) References Cited

U.S. PATENT DOCUMENTS

| | | | |
|---|---|---|---|
| 4,839,574 A | | 6/1989 | Takabayashi |
| 5,334,463 A | * | 8/1994 | Tajima et al. .................. 429/9 |
| 6,158,537 A | * | 12/2000 | Nonobe ...................... 180/65.8 |
| 6,166,934 A | * | 12/2000 | Kajouke et al. ............... 363/65 |
| 6,255,008 B1 | * | 7/2001 | Iwase ......................... 180/65.3 |
| 6,321,145 B1 | * | 11/2001 | Rajashekara .................. 701/22 |
| 6,369,461 B1 | * | 4/2002 | Jungreis et al. ............... 429/22 |
| 6,380,638 B1 | * | 4/2002 | Bitsche et al. ............ 290/40 C |
| 6,416,893 B1 | * | 7/2002 | Clingerman et al. .......... 429/17 |
| 6,428,917 B1 | * | 8/2002 | Lacy et al. .................... 429/23 |
| 6,447,939 B1 | * | 9/2002 | Iwasaki ....................... 180/65.3 |
| 6,566,004 B1 | * | 5/2003 | Fly et al. ....................... 429/39 |
| 6,583,523 B1 | * | 6/2003 | Bhate ........................... 307/86 |
| 6,628,011 B2 | * | 9/2003 | Droppo et al. ................ 307/43 |

FOREIGN PATENT DOCUMENTS

| | | |
|---|---|---|
| EP | 0 972 668 | 1/2000 |
| JP | 2000-12059 | 1/2000 |
| JP | 2000-36308 | 2/2000 |

OTHER PUBLICATIONS

Patent Abstracts of Japan, JP 11–067253, Mar. 9, 1999.
Patent Abstracts of Japan, JP 07–123609, May 12, 1995.
Patent Abstracts of Japan, JP 06–275296, Sep. 30, 1994.

* cited by examiner

*Primary Examiner*—Hau Phan
(74) *Attorney, Agent, or Firm*—Oblon, Spivak, McClelland, Maier & Neustadt, P.C.

(57) ABSTRACT

A power supply system includes a fuel cell and a battery connected in parallel. A DC-DC converter is connected to the battery. A maximum output ratio of the fuel cell and the battery is set to be in a range where the output of the fuel cell is within 65 to 80% of the total output. Accordingly, electric power loss owing to conversion performed by the DC-DC converter is reduced to achieve a high energy efficiency.

17 Claims, 6 Drawing Sheets

DC POWER SUPPLY USING FUEL CELL

INCORPORATION BY REFERENCE

The disclosure of Japanese Patent Application No. 2000-304595 filed on Oct. 4, 2000 including the specification, drawings and abstract is incorporated herein by reference in its entirety.

BACKGROUND OF THE INVENTION

1. Field of the Invention

The invention relates to a DC power supply using a fuel cell.

2. Description of Related Art

Fuel cells have been gaining much attention in recent years as a power supply with a high operation efficiency and environmental characteristics. A fuel cell generates electricity through an electrochemical reaction of hydrogen and oxygen and outputs electric power as required by controlling an amount of a fuel gas to be supplied. In some cases, however, the response of the electric power output is lowered due to the delay in supply of the fuel gas. In order to avoid the aforementioned problem, a technique in which a fuel cell and a battery are connected in parallel to constitute a power supply system has been proposed. For example, in Japanese Patent Laid-Open Publication No. 2000-12059, the output voltage of the fuel cell is converted by a DC-DC converter to allow usage of a battery and a fuel cell in combination. In the aforementioned structure, however, the electric power output efficiency is desired to be further improved.

SUMMARY OF THE INVENTION

It is an object of the invention to provide a technology that improves an output efficiency of a direct current (DC) power supply using a fuel cell and a chargeable/dischargeable electric power storage unit in combination.

In order to solve the above-mentioned problem, a DC power supply system according to the invention comprises a pair of terminals that generate an electric power, a fuel cell connected to the terminals, a DC/DC converter connected to the terminals, and an electric power storage unit that is connected to the terminals via the DC-DC converter in parallel with the fuel cell, the electric power storage unit being able to be charged and discharged. The electric power of the fuel cell is output directly from the terminals. The electric power of the electric power storage unit is output through the DC-DC converter.

In a typical DC-DC converter, a loss of the electric power is caused by voltage conversion. The invention may prevent the loss of the electric power generated by the fuel cell by connecting the DC-DC converter to the electric power storage unit. In a typical power supply system having a fuel cell and an electric power storage unit, the electric power is mainly supplied from the fuel cell. Accordingly, the output efficiency of the entire power supply system can be improved by preventing the loss of the electric power supplied from the fuel cell. Since the fuel cell is used more frequently than the battery, the invention is effective especially when a maximum output power of the fuel cell is greater than a maximum output power of the electric power storage unit.

In the invention, it is preferable that at least a part of the fuel-cell (FC) accessories is directly connected to the electric power storage unit such that the at least a part of the fuel-cell accessories can be driven by the electric power storage unit serving as a power supply.

The FC accessories include various devices required for the system configuration of the fuel cell, such as a pump that supplies a fuel gas, a heater required for extracting hydrogen from a hydrogen absorbing alloy, or a reformer that reforms a material such as methanol to produce the fuel gas. According to the aforementioned configuration, the FC accessories are supplied with the electric power directly from the electric power storage unit. The electric power can be directly supplied to the FC. Therefore the FC accessories, and accordingly, the fuel cell can be operated irrespective of failure in the DC-DC converter. In the above structure, even in the state where the fuel cell is not sufficiently warmed up to generate the electric power, operation of the FC accessories independent of the DC-DC converter makes it possible to warm up and start the fuel cell. The invention is not limited to a configuration in which all the FC accessories are connected to the electric power storage unit. For example, at least a part of the FC accessories required for warming up the fuel cell may be connected to the electric power storage unit, and the rest of the FC accessories may be connected to the fuel cell.

In the invention, an output voltage of the DC/DC converter is controlled to be substantially equal to an output voltage of the fuel cell. The aforementioned control makes it possible to generate the electric power by operating the electric power storage unit to compensate for the response delay in the output of the fuel cell with respect to the required electric power.

In the invention, it is preferable to control the output voltage of the DC-DC converter to a predetermined value at which the electric power storage unit can be charged by one of the fuel cell and the terminals. The value of the voltage supplied to the electric power storage unit charged in the aforementioned manner may be fixed or varied according to the electric power during charging.

In the invention, it is preferable that the electric power storage unit be a secondary battery. It is also possible to employ a capacitor or other rechargeable devices as the electric power storage unit.

In the aforementioned case, although the invention is applied to the direct current power supply system, it can be realized in various forms. For example, the invention may be applied to a vehicle that employs a motor, as a driving power supply, which is driven by the aforementioned DC power supply system. In such a vehicle, vehicle accessories may be operatively connected directly to an electric power storage unit as a power source. The vehicle accessories include, for example, an oil pump, a lighting unit, an air conditioning unit, and the like. The aforementioned configuration ensures to operate the vehicle accessories irrespective of the failure in the DC-DC converter.

The invention may be applied to a method of outputting a DC current using a fuel cell and a chargeable/dischargeable electric power storage unit which are connected in parallel to output terminals.

DETAILED DESCRIPTION OF PREFERRED EMBODIMENT

An embodiment of the invention to be used in a hybrid vehicle will be described in the following sections.

A. System configuration:
B. Electric power control routine:
C. Output ratio setting:
D. Effect:

A. System Configuration

Figure 1:
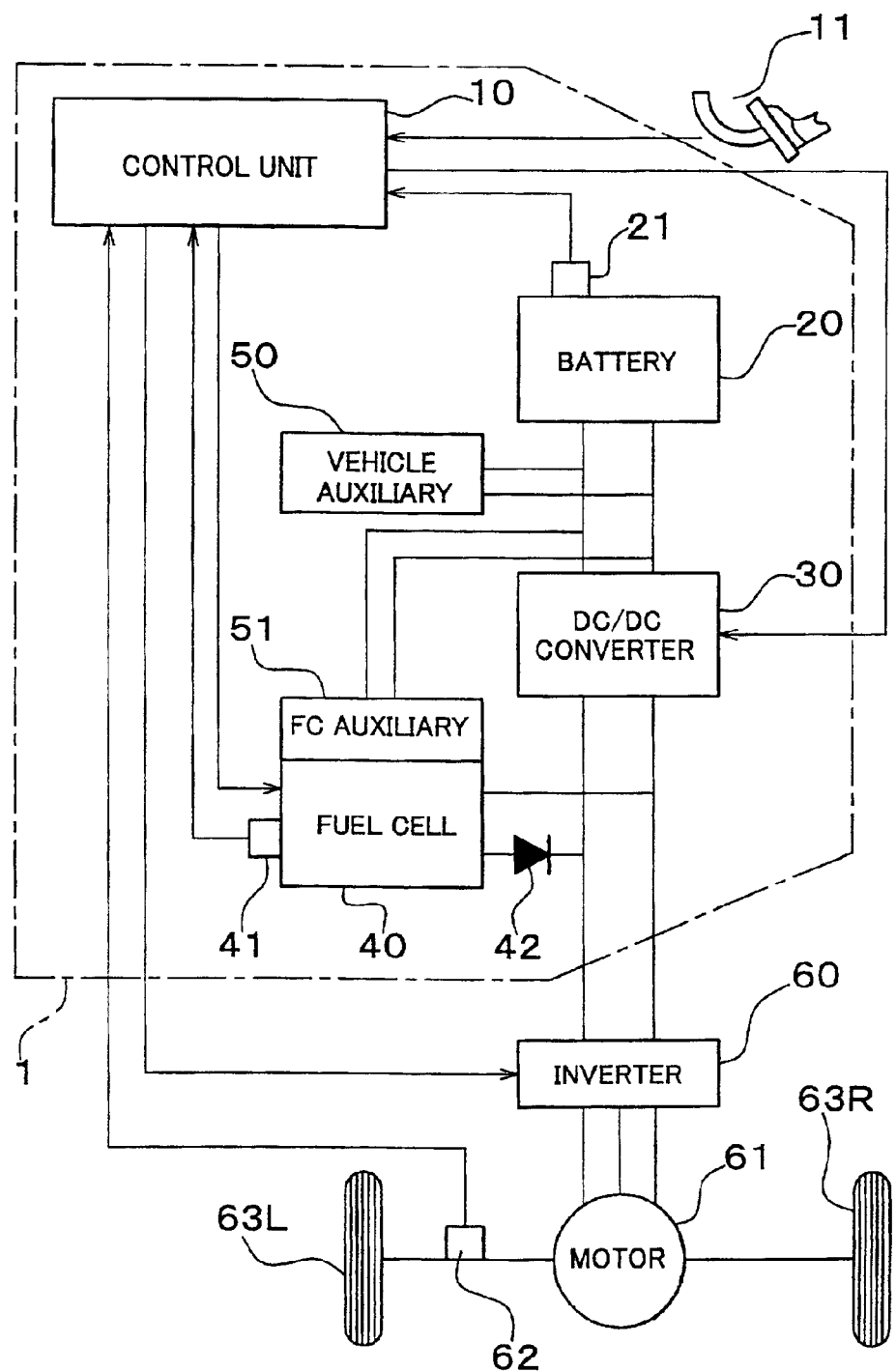
FIG. 1 is a schematic diagram illustrating the structure of a vehicle that employs a power supply system as an embodiment of the invention.

FIG. 1 is a schematic diagram illustrating a vehicle that employs a power supply system as an embodiment of the invention. The vehicle is driven by a synchronous motor 61 as a driving power source coupled to wheels 63L and 63R. The synchronous motor 61 is driven by a power supply system 1. Direct current output from the power supply system 1 is inverted by an inverter 60 into a three-phase alternating current to be supplied to the synchronous motor 61. The synchronous motor 61 may be constructed to serve as a generator when the vehicle is in a braking state.

The power supply system 1 includes a fuel cell 40, a battery 20 as the electric power storage unit, and a DC-DC converter 30 and the like. The fuel cell 40 generates electric power through electrochemical reaction between hydrogen and oxygen. This embodiment employs a proton-exchange membrane fuel cell. However, various types of the fuel cell such as a phosphoric-acid fuel cell and a molten carbonate fuel cell may be employed. Hydrogen gas used for generating the electric power is produced by reforming a material such as alcohol. In the embodiment, the fuel cell 40 may include a stack that generates the electric power and a reformer that generates a fuel gas. The fuel cell 40 may employ a construction which stores hydrogen itself, in place of the reformer, using a hydrogen absorbing alloy, a hydrogen cylinder and the like.

A battery 20 is a chargeable/dischargeable secondary battery, for example, a nickel-metal hydride battery in the present embodiment. Various types of secondary batteries may be employed as the battery 20. The invention may be configured to employ a chargeable/dischargeable electric power storage unit, for example, a capacitor, in place of the secondary battery.

Referring to FIG. 1, the fuel cell 40 and the battery 20 are connected in parallel to an inverter 60. A diode 42 that prevents reversal of the current from the battery 20 or the current generated by the synchronous motor 61 is disposed on a path between the fuel cell 40 and the inverter 60. Each electric power from the fuel cell 40 and the battery 20 connected in parallel may be selectively used by controlling a relative pressure difference between the fuel cell 40 and the battery 20. In this embodiment, a DC-DC converter 30 is disposed on a path between the battery 20 and the inverter 60 for the purpose of executing the aforementioned control. The DC-DC converter 30 as a direct current voltage converter regulates the DC voltage supplied from the battery 20 and outputs the electric power to the inverter 60. The DC-DC converter 30 also regulates the DC voltage input from the fuel cell 40 or the motor 61 and outputs the electric power to the battery 20. The battery 20 can be charged or discharged by the aforementioned functions of the DC-DC converter 30.

Vehicle accessories 50 and FC accessories 51 are connected to a path between the battery 20 and the DC-DC converter 30. The battery 20, thus, serves as the power source for the vehicle accessories 50 and the FC accessories 51. The vehicle accessories 50 include various electric devices to be used during operation of the vehicle, such as a lighting unit, an air conditioning unit, and a hydraulic pump. The FC accessories 51 include various electric devices used for operating the fuel cell 40, such as a pump for supplying a fuel gas or the material to be reformed, and a heater for regulating the temperature of the reformer.

A control unit 10 controls operation of each of the aforementioned devices. The control unit 10 is configured as a microcomputer having a CPU, RAM, and ROM. The control unit 10 controls switching of the inverter 60 to output a three phase alternating current in accordance with the required driving power to the synchronous motor 61. The control unit 10 controls each operation of the fuel cell 40 and the DC-DC converter 30 to ensure supply of the electric power in accordance with the required driving power.

The control unit 10 receives signals input from various kinds of sensors for executing the aforementioned controls. Those signals are output from such sensors as an accelerator pedal sensor 11, an SOC sensor 21 that detects SOC (State of Charge) of the battery 20, a flow rate sensor 41 that detects a flow rate of gas in the fuel cell 40, and a vehicle speed sensor 62 that detects the vehicle speed. Other sensors connected to the control unit 10 are not shown.

B. Electric Power Control Processing

Figure 2:
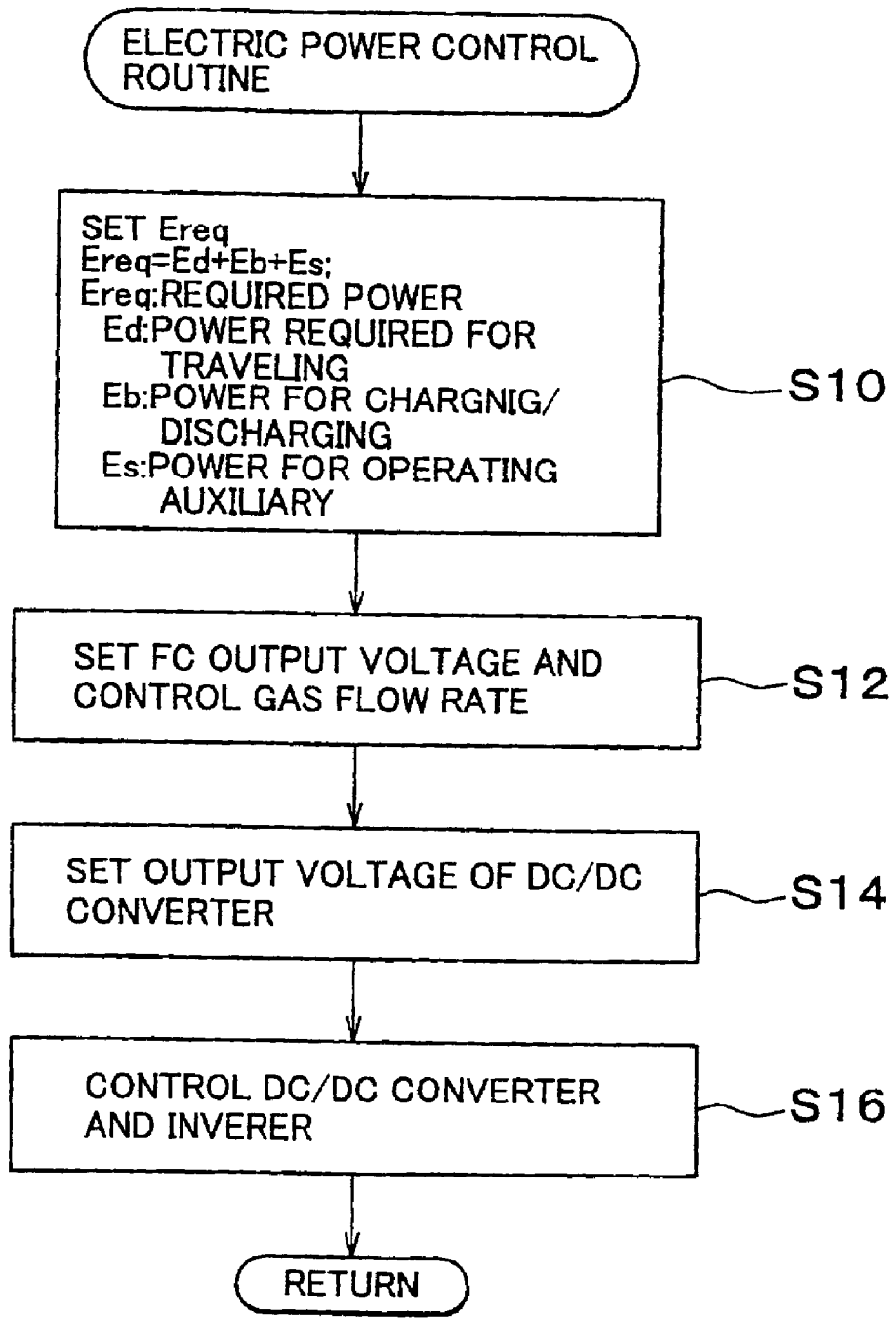
FIG. 2 is a flowchart of an electric power control routine executed during traveling of the vehicle.

FIG. 2 is a flowchart of an electric power control routine during a vehicle operation. The control unit 10 repeats the control routine while executing other control schemes to control driving of the motor 61, and to operate the vehicle.

In step S10, the control unit 10 sets a required electric power Ereq to be generated by the fuel cell 40 by calculating a sum of an electric power Ed required for operating the vehicle, an electric power Eb required for charging/discharging the battery, and an electric power Es for operating accessories.

The electric power Ed to be supplied to the motor 61 for operating the vehicle is set in the following manner. First the control unit 10 sets target values of a revolution and a torque of the motor 61. Those values are defined by a table of an opening degree of an accelerator pedal and a vehicle speed. A product of those target values indicates the driving power to be output from the motor 61. Then the calculated value indicating the driving power is divided by the operation efficiency of the motor 61, that is, a ratio of the driving power output per electric power consumption. The calculated result becomes the electric power Ed. In the case of using the motor 61 as a generator for regenerative braking, the target torque becomes a negative value. The electric power Ed, thus, becomes a negative value.

The electric power Eb is required for charging and discharging the battery 20. The SOC of the battery 20 is controlled to be maintained in a predetermined range. The battery 20 is charged when the SOC becomes lower than a predetermined lower limit. The electric power Eb is set to a positive value in accordance with the electric power required to be charged. Consequently, the required electric power Ereq increases as the battery 20 is charged. On the other hand, the battery 20 is discharged when the SOC becomes higher than a predetermined upper limit. The electric power Eb is set to a negative value in accordance with the electric power required for discharging. The required electric power Ereq decreases as the battery 20 is discharged.

The electric power Es is required for driving the vehicle accessories 50 and the FC accessories 51. The electric power Es is set for both accessories in accordance with the respective operation states of the accessories.

Figure 3A:
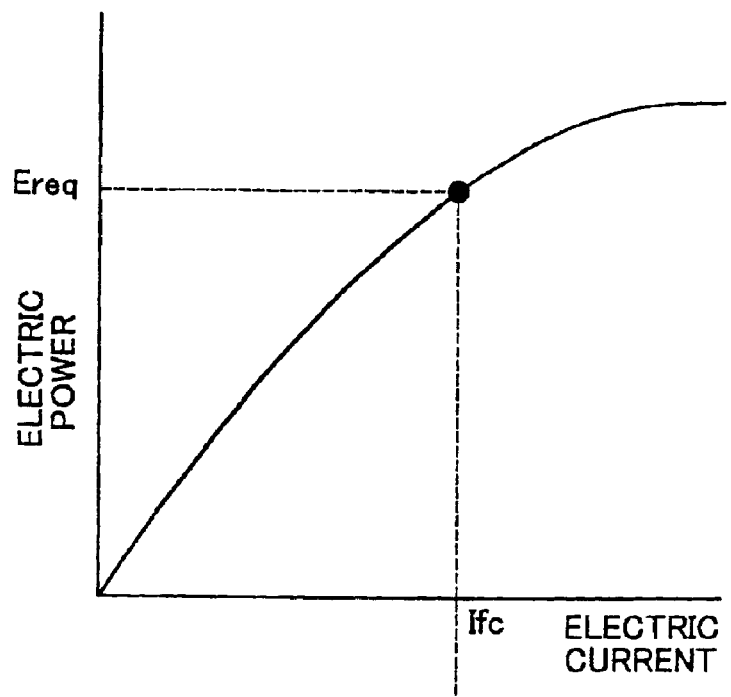
FIGS. 3A and 3B illustrate output characteristics of a fuel cell.
Figure 3B:
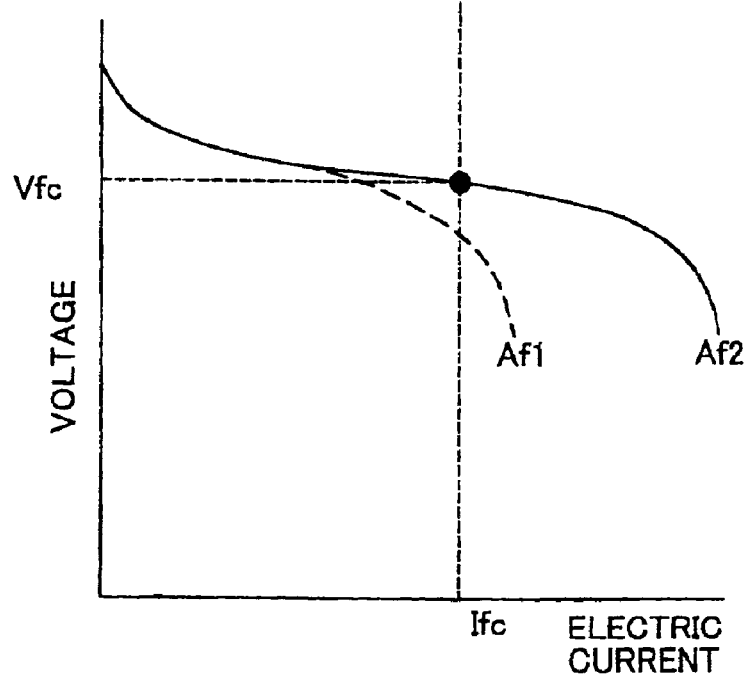

The process proceeds to step S12 in which the control unit 10 sets the output voltage of the fuel cell 40 so as to output the required electric power Ereq set in step S10 and controls a flow rate of the gas in the fuel cell 40. The voltage is set in accordance with maps shown in FIGS. 3A and 3B which represent the output characteristics of the fuel cell 40. FIG. 3A represents the relationship between the electric power and the electric current, and FIG. 3B represents the relationship between the voltage and the electric current.

The output characteristics of the fuel cell 40 vary in accordance with the flow rate of the supplied gas. A curve Af1 in FIG. 3B shows a state of a low flow rate of the gas, while a curve Af2 shows a state of a high flow rate of the gas. As the gas flow rate becomes lower, the point at which the voltage starts dropping shifts to a lower current side.

On the basis of the map shown in FIG. 3A, the current value Ifc in accordance with the required electric power Ereq can be obtained. On the basis of the voltage-current characteristics map of FIG. 3B, a voltage Vfc according to the current Ifc can be obtained. When the gas flow rate of the fuel cell 40 is too low to generate the required electric power at a sufficient voltage value, a target value for the gas flow rate is determined based on the maps shown in FIGS. 3A and 3B.

Next in step S14, the control unit 10 sets a value of the output voltage of the DC-DC converter 30. In the case where the battery 20 is discharged, that is, the electric power Eb is negative, the output voltage of the DC-DC converter 30 is controlled to correspond to the output voltage value of the fuel cell by inputting the electric power from the battery to the inverter 60. In case the battery 20 is charged, that is, the electric power Eb is positive, the output voltage of the DC-DC converter 30 is controlled to a predetermined value suited for charging the battery 20 by supplying the electric power from the inverter 60 to the battery 20. The predetermined value suited for charging the battery 20 may be kept constant or varied in accordance with the electric power to be charged.

In step S16, the control unit 10 controls the DC-DC converter 30 such that the output voltage of the DC-DC converter 30 becomes substantially equal to the set voltage. In addition, the control unit 10 controls the inverter 60 such that the required electric power is applied to the synchronous motor 61. The electric power corresponding to the supplied gas flow rate is output from the fuel cell 40 in response to switching of the inverter 60. The battery charges or discharges the electric power corresponding to the difference between the electric power supplied from the fuel cell 40 and the electric power consumed by the inverter 60. If, for example, a response delay occurs in the output of the fuel cell 40, the battery 20 may compensate for the resultant shortage of the electric power with respect to the required electric power Ereq. The electric power generated by the battery 20 gradually decreases as the output electric power of the fuel cell 40 increases to approach the required electric power Ereq. The aforementioned control makes it possible to supply electric power with a high response.

The vehicle accessories 50 and the FC accessories 51 are supplied with electric power at least from the battery 20. The electric power generated by the fuel cell 40 or the synchronous motor 61 may be supplied to those accessories during charging of the battery 20.

C. Setting of Output Ratio

In the foregoing description with respect to the electric power control, the fuel cell 40 is used as a main power supply, and the battery 20 is used as a power supply for an accessory that compensates for the response delay in the output of the fuel cell 40. The energy efficiency of the vehicle under the aforementioned condition changes depending on the output ratio of the fuel cell 40 and the battery 20. In the present embodiment, the output ratio is determined in the system designing process in accordance with the procedures as described below such that a high energy efficiency is achieved.

Figure 4:
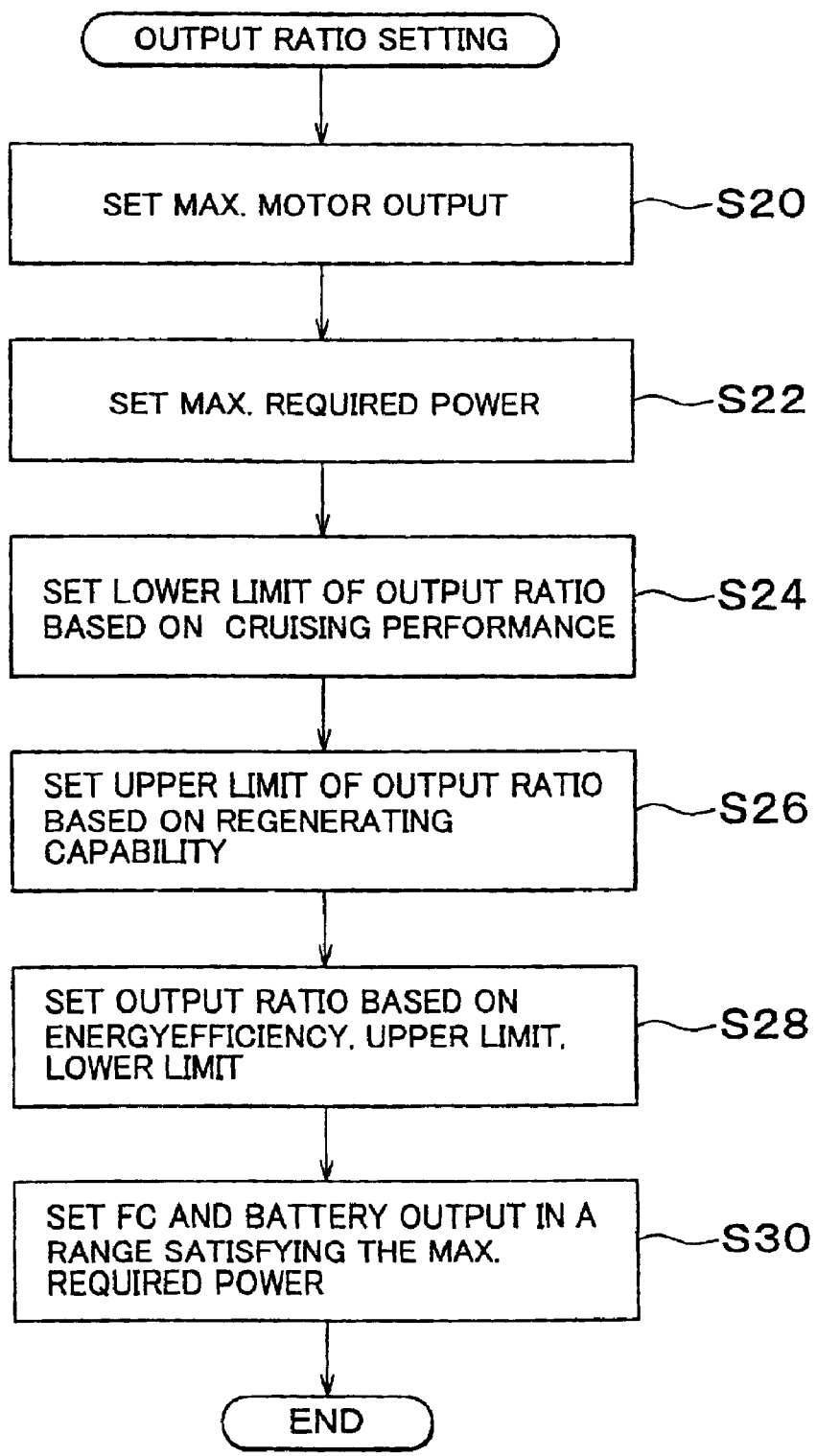
FIG. 4 is a flowchart of setting an output ratio of the fuel cell and a battery as an electric power storage unit.

FIG. 4 is a flowchart representing how the output ratio of the fuel cell 40 and the battery 20 is determined. First in step S20, a maximum output of the motor installed in a vehicle is set. The maximum output of the motor is determined by, for example, the vehicle weight, target maximum speed, acceleration and the like. Then in step S22, the maximum output is divided by the motor operation efficiency to set a maximum required electric power. The maximum required electric power may also be determined on the basis of the electric power consumed by accessories. In order to fully utilize the motor capacity, the sum of the maximum outputs of the fuel cell 40 and the battery 20 is required to be equal to or greater than the maximum required electric power.

Then in step S24, a lower limit and an upper limit of the output ratio of the fuel cell 40 and the battery 20 are determined in accordance with a predetermined basis that represents the vehicle driving conditions. In this embodiment, the output ratio is obtained by "dividing the maximum output of the battery into the maximum output of the fuel cell". The lower limit can be set on the basis of a cruising performance. If the cruising performance of the vehicle (weight: 2,000 kg, motor efficiency: 80%) travelling on a 4.5% gradient at 120 km/h is set as a target value, the required electric power is calculated to be approximately 65 kW. Assuming that the maximum required electric power is 100 kW, the output ratio required for the fuel cell 40 to output the required electric power for cruising is set to be equal to or greater than 0.65.

In step S26, the upper limit of the output ratio may be determined on the basis of a regeneration capacity of the battery. It is preferable to charge the battery 20 with the electric power regenerated by the motor 61 during braking such that the energy efficiency of the vehicle is enhanced. If the capacity of the battery 20 is too small to charge the regenerated electric power, the energy efficiency is degraded. Assuming that the vehicle (weight: 2,000 kg, motor efficiency: 80%) is driving at so-called 10–15 mode, the maximum regenerative electric power during deceleration is calculated to be 20 kW. If 100 kW is determined as the maximum required electric power, the capacity of the battery 20 required for charging the regenerative electric power is 20 kW. Accordingly, the upper limit of the output ratio is set to 0.8.

The lower and upper limits of the output ratio can be set to arbitrary values according to the target performance of the vehicle other than the aforementioned driving conditions.

Then in step 28, the output ratio is set on the basis of the energy efficiency of the vehicle, the upper and the lower limits of the output ratio. The energy efficiency can be evaluated in the following manner.

Figure 5:
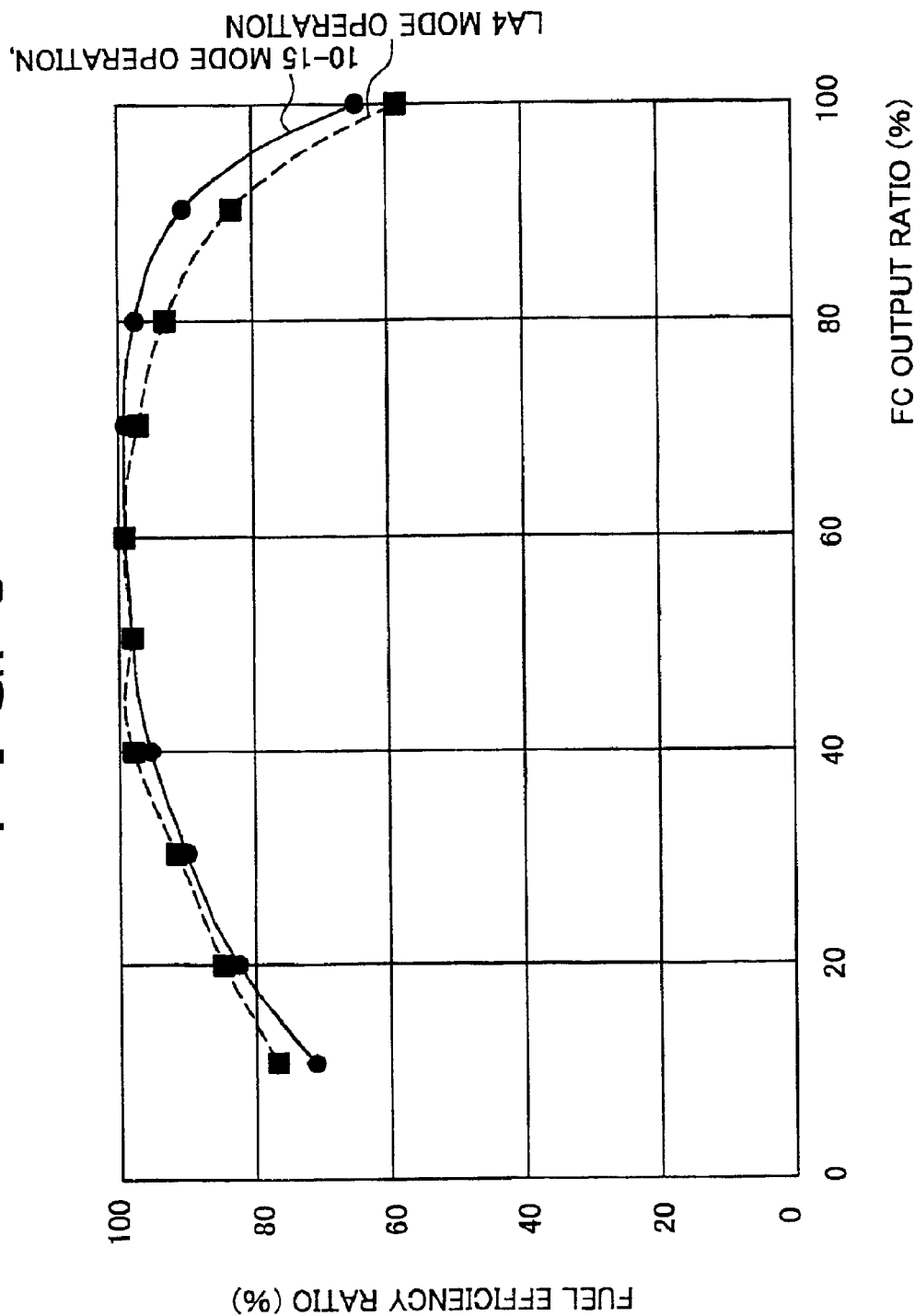
FIG. 5 shows an example of a relationship between the output ratio and the fuel efficiency ratio.

FIG. 5 is a graph illustrating the relationship between the output ratio and the fuel efficiency ratio. The graph shows the results of simulating the change in the fuel efficiency as the output ratio varies during traveling of the vehicle (weight: 2,000 kg, motor efficiency: 80%). In the graph, the simulation results for 10–15 mode operation are shown by a solid line and the simulation results for LA4 mode operation are shown by a broken line. The LA4 mode is used for calculating the fuel efficiency in the United States. The fuel efficiency ratio is obtained by normalizing the maximum fuel efficiency at each output ratio. As shown in FIG. 5, the fuel efficiency ratio becomes significantly high when the output ratio is in the range from 40% to 80%.

It is preferable, in the present embodiment, to set the output ratio ranging from 65 to 80% such that the energy efficiency becomes higher. In step S30, the output values of the fuel cell 40 and the battery 20 are set such that the output ratio is within the set range, and the sum of maximum output values of the fuel cell 40 and the battery 20 is equal to or greater than the maximum required electric power. In this embodiment, it is further preferable to set such that the sum of maximum output values of the fuel cell 40 and the battery 20 coincides with the maximum required electric power.

D. Effects

Figure 6:
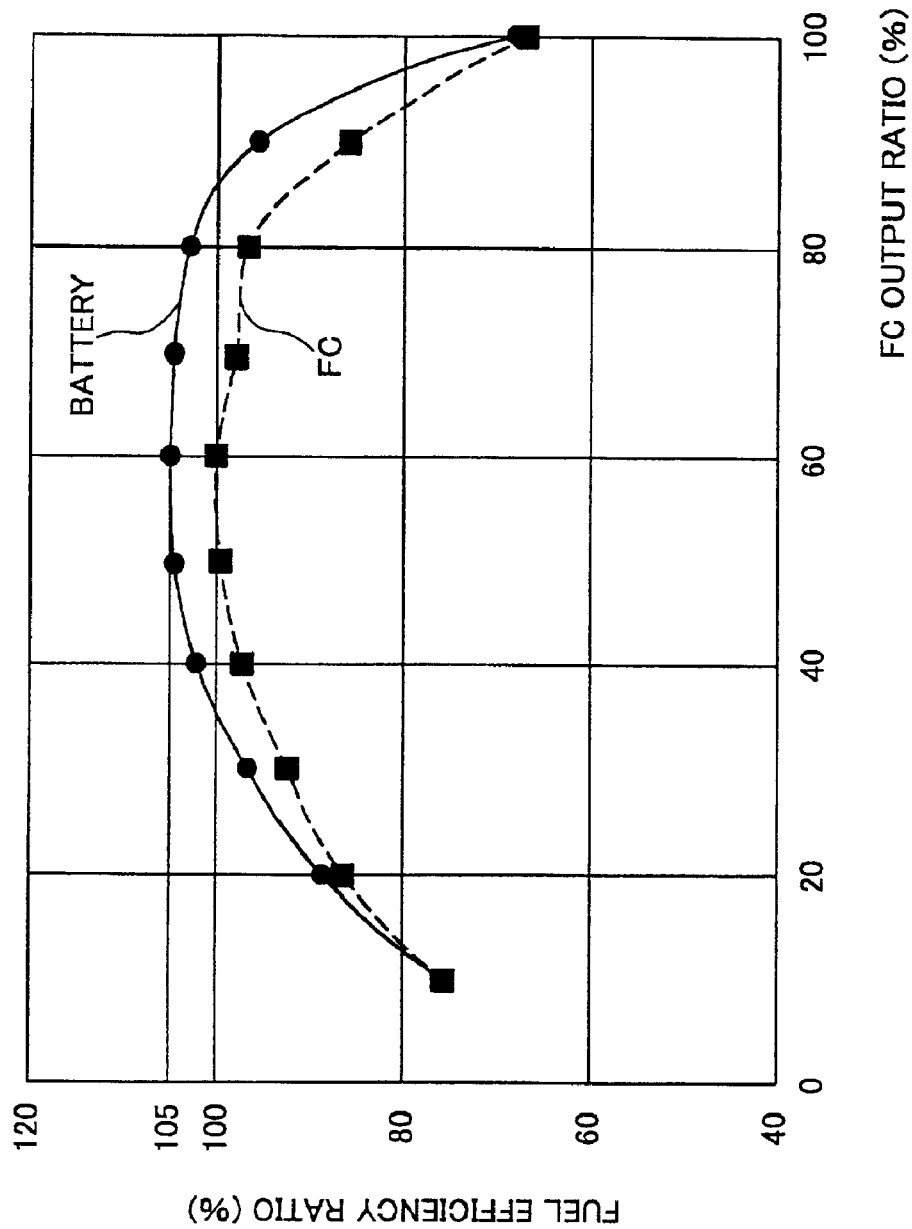
FIG. 6 shows a relationship between the output ratio and the fuel efficiency ratio with respect to each case in which the DC-DC converter is connected to the fuel cell or the battery.

According to the power supply system as aforementioned, excellent fuel efficiency can be obtained by the configuration in which the DC-DC converter 30 is connected to the battery 20. FIG. 6 is the graph showing an improved fuel efficiency ratio. The dashed line indicates the fuel efficiency ratio obtained by the configuration in which the DC-DC converter is connected to the fuel cell. The solid line indicates the fuel efficiency ratio obtained by the configuration according to the embodiment of the invention. The fuel efficiency ratio is derived from being normalized by the maximum fuel efficiency as used in the graph shown in FIG. 5. Referring to FIG. 5, the fuel efficiency ratio was improved by approximately 5% when connecting the DC-DC converter to the battery 20. The reason for such improvement will be described below.

In general, the efficiency of the DC-DC converter during voltage conversion ranges from approximately 90 to 95%. In the present embodiment, the fuel cell is used as the main power supply. Accordingly, the power supply system in which the DC-DC converter is connected to the fuel cell may suffer from the electric power loss owing to the voltage conversion. Meanwhile, the electric power loss owing to the voltage conversion may be prevented by connecting the DC-DC converter to the battery from where a relatively small amount of the electric energy is supplied.

By connecting the DC-DC converter to the battery that generates relatively small amount of the electric power, the size of the DC-DC converter can be reduced. Accordingly the size of the entire power supply system may be reduced.

In the power supply system of the present embodiment, the vehicle accessories 50 and the FC accessories 51 are connected to a path between the battery 20 and the DC-DC converter 30. Consequently, even when abnormality occurs in the DC-DC converter 30, or the fuel cell 40 is unable to generate electric power, those accessories may be supplied with the electric power. In the case where the fuel cell 40 is unable to generate sufficient electric power due to insufficient warm-up of the fuel cell 40, the battery 20 compensates for the electric power to drive the FC accessories 51, by which the fuel cell 40 can be warmed up and started. The vehicle accessories 50 can also be driven using the electric power within the capacity of the battery 20. Accordingly, reliability of the power supply system and the vehicle can be improved in the present embodiment.

According to the embodiment of the invention, the output ratio of the fuel cell 40 and the battery 20 can be optimized, and a high energy efficiency can be achieved. A power supply system that satisfies both the performance requirement and the energy efficiency requirement can be realized by setting the output ratio considering the operation efficiency as well as the target performance that determines the upper and lower limits of the output ratio.

An embodiment of the invention has been described heretofore, however, the invention is not limited such embodiment and may be in various forms without departing from scope and spirit of the invention. For example, the invention may be employed in power supply systems for various devices in addition to a vehicle.

What is claimed is:

1. A direct current power supply system for a vehicle, comprising:
    a pair of terminals that provide an electric power;
    a fuel cell connected to the terminals;
    a DC/DC converter connected to the terminals;
    an electric power storage unit that is connected to the terminals via the DC-DC converter in parallel with the fuel cell, the electric power storage unit being able to be charged and discharged, wherein a maximum output power of the fuel cell is greater than a maximum output power of the electric power storage unit; and
    a control unit adapted to set a lower limit of an output ratio of said fuel cell to said electric power storage unit, set an upper limit of the output ratio of said fuel cell to said electric power storage unit, and set an actual output ratio based upon said lower limit, said upper limit and an energy efficiency of the vehicle.

2. A direct current power supply system according to claim 1, further comprising fuel-cell accessories that operate to drive the fuel cell, wherein at least a part of the fuel-cell accessories is directly connected to the electric power storage unit such that the at least a part of the fuel-cell accessories can be driven by the electric power storage unit serving as a power supply.

3. A direct current power supply system according to claim 1, further comprising a controller that controls an output voltage of the DC/DC converter to be substantially equal to an output voltage of the fuel cell.

4. A direct current power supply system according to claim 1, further comprising a controller that controls an output voltage of the DC/DC converter to a predetermined voltage at which the electric power storage unit is allowed to be charged by one of the fuel cell and the terminals.

5. A direct current power supply system according to claim 1, wherein the electric power storage unit comprises a secondary battery.

6. The direct current power supply system of claim 1, wherein said control unit is adapted to set the lower and upper limits of the output ratio of said fuel cell to said electric power storage unit based on vehicle driving conditions.

7. A vehicle comprising:
    a motor serving as a driving power source,
    a drive circuit that drives the motor by electric power,
    a direct current power supply unit that supplies the electric power to the drive circuit, wherein the direct current power supply unit comprises:
    a pair of terminals that provide an electric power;
    a fuel cell connected to the terminals;
    a DC/DC converter connected to the terminals; and
    an electric power storage unit that is connected to the terminals via the DC-DC converter in parallel with the fuel cell, the electric power storage unit being able to be charged and discharged, wherein a maximum output power of the fuel cell is greater than a maximum output power of the electric power storage unit; and
    a control unit adapted to set a lower limit of an output ratio of said fuel cell to said electric power storage unit, set an upper limit of the output ratio of said fuel cell to said electric power storage unit, and set an actual output ratio based upon said lower limit, said upper limit and an energy efficiency of the vehicle.

8. A vehicle according to claim 7, further comprising vehicle accessories that operate to drive the vehicle, wherein at least a part of the vehicle accessories is directly connected to the electric power storage unit such that the at least one of the vehicle accessories can be driven by the electric power storage unit serving as a power supply.

9. A vehicle according to claim 7, further comprising fuel-cell accessories that operate to drive the fuel cell, wherein at least a part of the fuel-cell accessories is directly connected to the electric power storage unit such that the at least a part of the fuel-cell accessories can be driven by the electric power storage unit serving as a power supply.

10. A vehicle according to claim 7, further comprising a controller that controls an output voltage of the DC/DC converter to be substantially equal to an output voltage of the fuel cell.

11. A vehicle according to claim 7, further comprising a controller that controls an output voltage of the DC/DC converter to a predetermined voltage at which the electric power storage unit is allowed to be charged by one of the fuel cell and the terminals.

12. A vehicle according to claim 7, wherein the electric power storage unit comprises a secondary battery.

13. The vehicle of claim 7, wherein said control unit is adapted to set the lower and upper limits of the output ratio of said fuel cell to said electric power storage unit based on vehicle driving conditions.

14. A method for supplying a direct current from a fuel cell and an electric power storage unit that can be charged and discharged to output terminals, which are connected in parallel with the output terminals, wherein a maximum output power of the fuel cell is greater than a maximum output power of the electric power storage unit, the method comprising:

(a) operating the fuel cell to generate a predetermined voltage;

(b) converting a voltage generated by the electric power accumulating unit by using the DC-DC converter to a voltage equal to the predetermined voltage generated by the fuel cell and applying the converted voltage to the terminals; and setting an output ratio of said fuel cell to said electric power storage unit by setting a lower limit of the output ratio, setting an upper limit of the output ratio, and setting the output ratio based upon said lower limit, said upper limit and an energy efficiency of the vehicle.

15. The method of claim 14, wherein the lower and upper limits of the output ratio of said fuel cell to said electric power storage unit are set based on vehicle driving conditions.

16. A direct current power supply system for a vehicle, comprising:

a pair of terminals that provide an electric power;

a fuel cell connected to the terminals;

a DC/DC converter connected to the terminals;

an electric power storage unit that is connected to the terminals via the DC-DC converter in parallel with the fuel cell, the electric power storage unit being able to be charged and discharged, wherein a maximum output power of the fuel cell is greater than a maximum output power of the electric power storage unit; and control means for setting a lower limit of an output ratio of said fuel cell to said electric power storage unit based on vehicle driving conditions, setting an upper limit of the output ratio of said fuel cell to said electric power storage unit based on vehicle driving conditions, and setting an actual output ratio based upon said lower limit, said upper limit and an energy efficiency of the vehicle.

17. The direct current power supply system of claim 16, wherein said control means sets the lower and upper limits of the output ratio of said fuel cell to said electric power storage unit based on vehicle driving conditions.

* * * * *